United States Patent
Kim (10) Patent No.: US 9,554,179 B2
(45) Date of Patent: Jan. 24, 2017

(54) METHOD AND APPARATUS FOR TRANSMITTING AND RECEIVING DATA USING HDMI

(71) Applicant: LG ELECTRONICS INC., Seoul (KR)

(72) Inventor: Dokyun Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/157,974

(22) Filed: May 18, 2016

(65) Prior Publication Data

US 2016/0345055 A1 Nov. 24, 2016

Related U.S. Application Data

(60) Provisional application No. 62/163,937, filed on May 19, 2015.

(51) Int. Cl.

| | |
|---|---|
| H04N 3/27 | (2006.01) |
| H04N 5/38 | (2006.01) |
| H04N 5/44 | (2011.01) |
| H04N 21/4363 | (2011.01) |
| G06F 13/40 | (2006.01) |
| G06F 13/42 | (2006.01) |
| G06F 13/10 | (2006.01) |

(52) U.S. Cl.
CPC ...... *H04N 21/43635* (2013.01); *G06F 13/102* (2013.01); *G06F 13/4081* (2013.01); *G06F 13/42* (2013.01); *H04N 5/38* (2013.01); *H04N 5/44* (2013.01)

(58) Field of Classification Search
CPC .............. H04N 21/43635; H04N 21/43615; H04N 21/43637; H04N 5/38; H04N 5/44; H04N 5/4401; H04N 5/46; G06F 13/102; G06F 13/4081; G06F 13/42
USPC ........ 348/554, 723, 725; 725/67, 68, 81, 85, 725/98, 100, 117, 118, 131, 139, 147, 148, 151
IPC ..................................... H04N 3/27, 5/38, 5/44
See application file for complete search history.

(56) References Cited

U.S. PATENT DOCUMENTS

| | | | | |
|---|---|---|---|---|
| 2009/0256963 A1* | 10/2009 | Sato | ................ | H04N 5/4401 348/554 |
| 2010/0066919 A1* | 3/2010 | Nakajima | ................ | H04N 5/44 348/725 |
| 2014/0176804 A1* | 6/2014 | Toba | ................ | H04N 21/43615 348/723 |

* cited by examiner

*Primary Examiner* — Sherrie Hsia
(74) *Attorney, Agent, or Firm* — Dentons US LLP (57) ABSTRACT

A method for switching mode of a source device that uses a High Definition Multimedia Interface (HDMI) according to an embodiment of the present invention may include connecting to a sink device through the HDMI; transmitting +5V signal to the sink device; receiving a Hot Plug Detect (HPD) signal from the sink device; receiving EDID information including a first Sideband mode support information representing that the sink device supports a Sideband mode through a Display Data Channel (DDC) channel that operates in a DDC mode; transmitting a second Sideband mode support information representing that the source device supports a Sideband mode to the sink device; receiving instruction to perform an operation mode switching of the DDC channel from the sink device; and switching the operation mode of the DDC channel from the DDC mode to the Sideband mode.

20 Claims, 9 Drawing Sheets

| Byte / Bits # | 7 | 6 | 5 | 4 | 3 | 2 | 1 | 0 |
|---|---|---|---|---|---|---|---|---|
| 0 | Vendor Specific Tag Code (=3) | | | | | Length (=N) | | |
| 1 | IEEE OUI, Third Octet (0xD8) | | | | | | | |
| 2 | IEEE OUI, Second Octet (0x5D) | | | | | | | |
| 3 | IEEE OUI, First Octet (0xC4) | | | | | | | |
| 4 | Version (=1) | | | | | | | |
| 5 | Max_TMDS_Character_Rate | | | | | | | |
| 6 | SCDC_Present | RR_Capable | Rsvd(0) | Rsvd(0) | LTE_340Mcsc_scramble | Indpendent view | Dual_View | 3D_OSD_Disparity |
| 7 | Sideband Capable | Rsvd(0) | Rsvd(0) | Rsvd(0) | Rsvd(0) | DC_48bit_420 | DC_36bit_420 | DC_30bit_420 |
| ...N | Reserved (0) | | | | | | | |

| Offset | R/W | Name |
|---|---|---|
| 0x01 | R | Sink Version |
| 0x02 | R/W | Source Version |
| 0x10 | R/W | Update_0 |
| 0x11 | R/W | Update_1 |
| 0x12-0x1F | R | Reserved for Update Related Uses |
| 0x20 | R/W | TMDS_Config |
| 0x21 | R | Scrambler_Status |
| 0x30 | R/W | Config_0 |
| 0x31-0x3F | R | Reserved for Configuration |
| 0x40 | R | Status_Flag_0 |
| 0x41 | R | Status_Flag_1 |
| 0x42-0x4F | R | Reserved for Status Related Uses |
| 0x50 | R | Err_Det_0_L |
| 0x51 | R | Err_Det_0_H |
| 0x52 | R | Err_Det_1_L |
| 0x53 | R | Err_Det_1_H |
| 0x54 | R | Err_Det_2_L |
| 0x55 | R | Err_Det_2_H |
| 0x56 | R | Err_Det_Checksum |
| 0xC0 | R/W | Test_Config_0 |
| 0xC1-0xCF | R | Reserved for test features |
| 0xD0 | R | Manufacturer IEEE OUI, Third Octet |
| 0xD1 | R | Manufacturer IEEE OUI, Second Octet |
| 0xD2 | R | Manufacturer IEEE OUI, First Octet |
| 0xD3-0xDD | R | Device ID |
| 0xDE-0xFF | R/W | Manufacturer Specific |
| All Remaining Offsets | R | Reserved |

(b)

| Byte / Bits # | 7 | 6 | 5 | 4 | 3 | 2 | 1 | 0 |
|---|---|---|---|---|---|---|---|---|
| 0x30 | Rsvd(0) | Rsvd(0) | Rsvd(0) | Rsvd(0) | SB_Capable | SB_Sink | SB_Src | RR_Enable |

METHOD AND APPARATUS FOR TRANSMITTING AND RECEIVING DATA USING HDMI

CROSS-REFERENCE TO RELATED APPLICATIONS

This application priority to Provisional Application No. 62/163,937 filed on 19 May, 2015, in US the entire contents of which is hereby incorporated by reference in its entirety.

BACKGROUND OF THE INVENTION

Field of the Invention

The present invention relates to a method and apparatus for transmitting and receiving data using a High Definition Multimedia Interface (HDMI), and more particularly, to a method and apparatus for utilizing a Display Data Channel (DDC) in DDC mode or sideband mode.

Discussion of the Related Art

HDMI is an interface/standard that develops a Digital Visual Interface (DVI) which is an interface standard of personal computers and displays for a use of AV electronic products. Since the HDMI transmits video/audio from a player to a display device without compressing it, there is very little latency between a source device and a sink device. And the HDMI has high format compatibility since the HDMI does not require separate decoder chip or software. In addition, the HDMI is available to make wirings between AV devices be simplified, which were complicated because video signals, audio signals and control signals are transmitted on only one cable, and the HDMI provides a High-bandwidth Digital Content Protection (HDCP) technique, thereby providing the copyright protection function.

SUMMARY OF THE INVENTION

As the UHD TV is started to be used, the UHD contents are provided through various storage media and services in order to provide a sense of vivid realism and a sense of immersion to a viewer. As a way for a viewer to enjoy the UHD contents, the viewer may enjoy uncompressed videos by connecting external source devices such as a UHD TV, a set-top box, a blue-ray disk player, and the like to wired video interfaces such as an HDMI, a DisplayPort, and so on. Furthermore, portable devices such as a smart phone, a tablet, an ultra notebook PC, and the like are started to be provided as the UHD contents source devices.

However, there is a restriction in stably providing high-definition (about 8K or more) UHD contents in high speed using only the channels which are defined in the conventional HDMI system of version 2.0 or lower.

In order to solve the technical problem, a method for switching mode of a source device that uses a High Definition Multimedia Interface (HDMI), comprising: connecting to a sink device through the HDMI; transmitting +5V signal to the sink device; receiving a Hot Plug Detect (HPD) signal from the sink device; receiving EDID (Extended Display Identification Data) information including a first Sideband mode support information through a Display Data Channel (DDC) channel that operates in a DDC mode, wherein the first Sideband mode support information indicates that the sink device supports a Sideband mode; transmitting a second Sideband mode support information to the sink device, wherein the second Sideband mode indicates that the source device supports the Sideband mode; receiving instruction to switch an operation mode of the DDC channel from the sink device; and switching the operation mode of the DDC channel from the DDC mode to the Sideband mode.

Further, the method for switching mode of the source device, wherein the first Sideband mode support information is received in HDIM Forum-Vendor Specific Data Block (HF-VSDB) format, and wherein the second Sideband mode support information is transmitted in Status and Control Data Channel (SCDC) format.

Further, the method for switching mode of the source device, wherein the receiving the instruction to switch an operation mode of the DDC channel includes: receiving a result value of a logical calculation of a first field value corresponding the first Sideband mode support information within SCDC structure (SCDCS) of the sink device and a second field value corresponding the second Sideband mode support information received from the source device.

Further, the method for switching mode of the source device, wherein the sink device is configured to: write in '1' in the first field as the first Sideband mode support information within the SCDCS, write in '1' in the second field as the second Sideband mode support information received from the source device, and obtain the result value by performing AND operation of the first and second field values and transmitting the result value to the source device.

Further, the method for switching mode of the source device, wherein the Sideband mode is a mode that uses the DDC channel for transmitting and receiving at least one of a clock signal, High-bandwidth Digital Content Protection (HDCP) data, user input information, multi-touch input information or audio only contents.

Further, a method for switching mode of a sink device that uses a High Definition Multimedia Interface (HDMI), comprising: connecting to a source device through the HDMI; receiving +5V signal from the source device; transmitting a Hot Plug Detect (HPD) signal from the source device; transmitting EDID (Extended Display Identification Data) information including a first Sideband mode support information through a Display Data Channel (DDC) channel that operates in a DDC mode, wherein the first Sideband mode support information indicates that the sink device supports a Sideband mode; receiving a second Sideband mode support information from the source device, wherein the second Sideband mode indicates that the source device supports the Sideband mode; instructing the source device to switch an operation mode of the DDC channel; and switching the operation mode of the DDC channel from the DDC mode to the Sideband mode.

Further, the method for switching mode of the sink device, wherein the first Sideband mode support information is transmitted in HDIM Forum-Vendor Specific Data Block (HF-VSDB) format, and wherein the second Sideband mode support information is received in Status and Control Data Channel (SCDC) format.

Further, the method for switching mode of the sink device, wherein the instructing the source device to switch the operation mode of the DDC channel includes: transmitting a result value of a logical calculation of a first field value corresponding to the first Sideband mode support information within SCDC structure (SCDCS) of the sink device and a second field value corresponding to the second Sideband mode support information received from the source device.

Further, the method for switching mode of the sink device, wherein the instructing the source device to switch the operation mode of the DDC channel includes: writing '1' in the first field as the first Sideband mode support information within the SCDCS, writing '1' in the second field as the second Sideband mode support information received from the source device, and obtaining the result value by performing AND operation of the first and second field values.

Further, the method for switching mode of the sink device, wherein the Sideband mode is a mode that uses the DDC channel for transmitting and receiving at least one of a clock signal, High-bandwidth Digital Content Protection (HDCP) data, user input information, multi-touch input information or audio only contents.

Further, a source device performing a mode switching using a High Definition Multimedia Interface (HDMI), comprising: a HDMI transmitter configured to transmitting and receiving data through the HDMI; and a control unit configured to control the HDMI transmitter, wherein the source device is configured to: transmit +5V signal to the sink device; receive a Hot Plug Detect (HPD) signal from the sink device; receive EDID (Extended Display Identification Data) information including a first Sideband mode support information through a Display Data Channel (DDC) channel that operates in a DDC mode, wherein the first Sideband mode support information indicates that the sink device supports a Sideband mode; transmit a second Sideband mode support information to the sink device, wherein the second Sideband mode indicates that the source device supports the Sideband mode; receive instruction to switch an operation mode of the DDC channel from the sink device; and switch the operation mode of the DDC channel from the DDC mode to the Sideband mode.

Further, the method for switching mode of the source device, wherein the first Sideband mode support information is received in HDIM Forum-Vendor Specific Data Block (HF-VSDB) format, and wherein the second Sideband mode support information is transmitted in Status and Control Data Channel (SCDC) format.

Further, the method for switching mode of the source device, wherein the source device is configured to: receive instruction to switch the operation mode of the DDC channel by receiving a result value of a logical calculation of a first field value corresponding to the first Sideband mode support information within SCDC structure (SCDCS) of the sink device and a second field value corresponding to the second Sideband mode support information received from the source device.

Further, the method for switching mode of the source device, wherein the sink device is configured to: write '1' in the first field as the first Sideband mode support information within the SCDCS, write '1' in the second field as the second Sideband mode support information received from the source device, and obtain the result value by performing AND operation of the first and second field values and transmit the result value to the source device.

Further, the method for switching mode of the source device, wherein the Sideband mode is a mode that uses the DDC channel for transmitting and receiving at least one of a clock signal, High-bandwidth Digital Content Protection (HDCP) data, user input information, multi-touch input information or audio only contents.

Further, a sink device performing a mode switching using a High Definition Multimedia Interface (HDMI), comprising: a HDMI receiver configured to transmitting and receiving data through the HDMI; and a control unit configured to control the HDMI receiver, wherein the sink device is configured to: connect to a source device through the HDMI; receive +5V signal from the source device; transmit a Hot Plug Detect (HPD) signal from the source device; transmit EDID (Extended Display Identification Data) information including a first Sideband mode support information through a Display Data Channel (DDC) channel that operates in a DDC mode, wherein the first Sideband mode support information indicates that the sink device supports a Sideband mode; receive a second Sideband mode support information from the source device, wherein the second Sideband mode indicates that the source device supports the Sideband mode; instruct the source device to switch an operation mode of the DDC channel; and switch the operation mode of the DDC channel from the DDC mode to the Sideband mode.

Further, the method for switching mode of the sink device, wherein the first Sideband mode support information is transmitted in HDIM Forum-Vendor Specific Data Block (HF-VSDB) format, and wherein the second Sideband mode support information is received in Status and Control Data Channel (SCDC) format.

Further, the method for switching mode of the sink device, wherein the sink device is configured to: instruct the source device to switch the operation mode of the DDC channel by transmitting a result value of a logical calculation of a first field value corresponding to the first Sideband mode support information within SCDC structure (SCDCS) of the sink device and a second field value corresponding to the second Sideband mode support information received from the source device.

Further, the method for switching mode of the sink device, wherein the sink device is configured to: write '1' in the first field as the first Sideband mode support information within the SCDCS, write '1' in the second field as the second Sideband mode support information received from the source device, and obtain the result value by performing AND operation of the first and second field values and transmit the result value to the source device.

Further, the method for switching mode of the sink device, wherein the Sideband mode is a mode that uses the DDC channel for transmitting and receiving at least one of a clock signal, High-bandwidth Digital Content Protection (HDCP) data, user input information, multi-touch input information or audio only contents.

BRIEF DESCRIPTION OF THE DRAWINGS

The accompanying drawings, which are included to provide a further understanding of the present invention and constitute a part of specifications of the present invention, illustrate embodiments of the present invention and together with the corresponding descriptions serve to explain the principles of the present invention.

DETAILED DESCRIPTION OF THE INVENTION

Although the terms used in the present specification are selected as general terms which are currently used widely as possible while considering functions in the present specification, the terms may be changed according to intentions of those skilled in the art, practices and advents of new techniques. In addition, in a special case, a term is discretionally selected by the applicant. In this case, the meaning of the term will be described in the corresponding embodiment of the detailed description. Accordingly, the terms used in the present specification should be interpreted based on the substantive meanings of the terms and based on the description throughout the present specification, not based on simple nominal terms.

Further, the embodiments will be described in detail by reference to the accompanying drawings and the contents shown in the accompanying drawings, but the present invention is not restricted or limited to the embodiments.

Hereinafter, the preferred embodiment of the present invention will be described in more detail by reference to the accompanying drawings.

Figure 1:
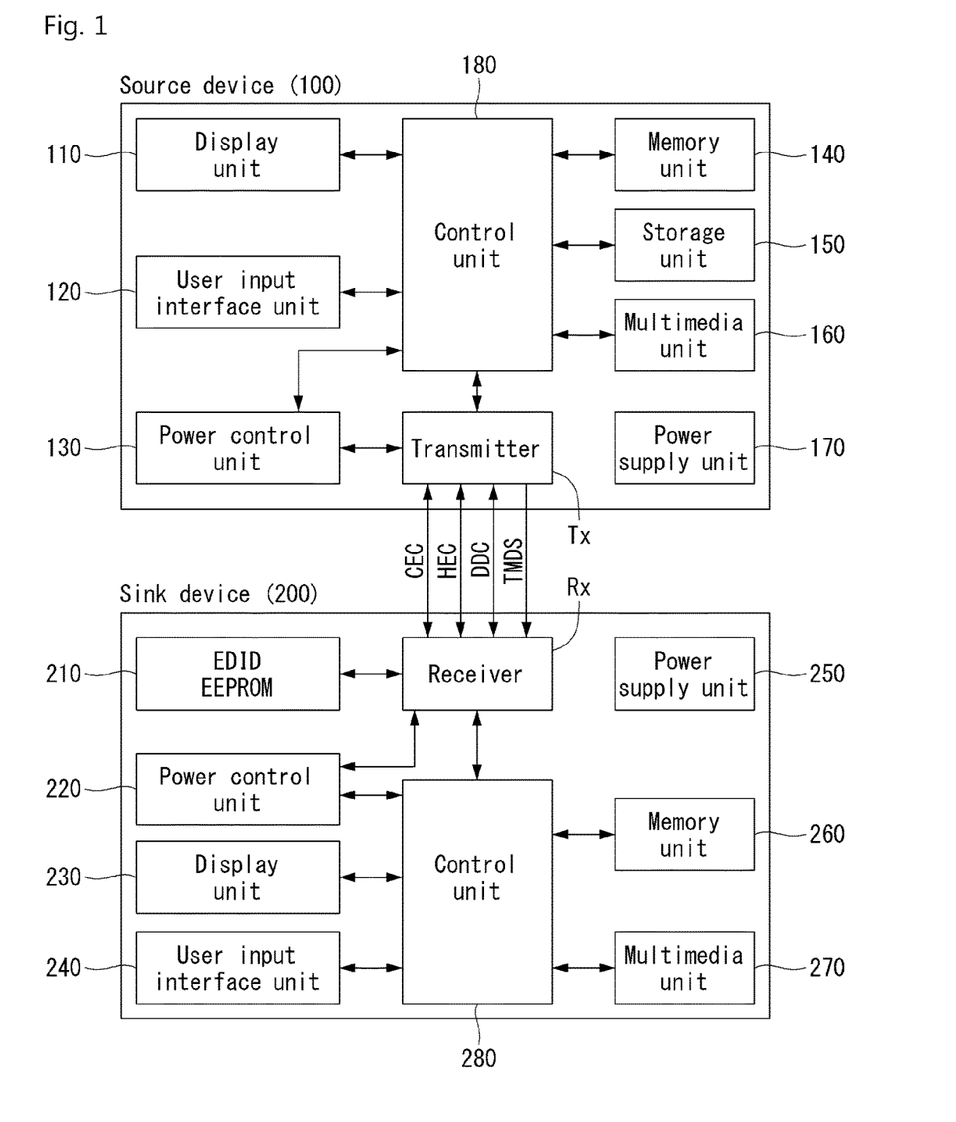
FIG. 1 is a block diagram illustrating an HDMI system according to an embodiment of the present invention.

FIG. 1 is a block diagram illustrating an HDMI system according to an embodiment of the present invention. Hereinafter, the devices that transmit and receive video/audio/control data using the HDMI will be collectively referred to the HDMI system.

Referring to FIG. 1, the HDMI system may include a source device 100 and a sink device 200. Particularly, in the HDMI system, a device that transmits video/audio data through the HDMI may correspond to the source device 100, and a device that receives video/audio data through the HDMI may correspond to the sink device 200. As physical devices for supporting data transmission and reception by connecting two devices, HDMI cables and connectors may be provided.

The HDMI cables and the connectors may perform pairing of four channels that provides a Transition Minimized Differential Signaling (TMDS) data channel and a TMDS clock channel. The TMDS data channels may be used for forwarding video data, audio data and auxiliary data.

In addition, the HDMI system provides a Video Electronics Standards Association (VESA) Display Data Channel (DDC). The DDC is used for a configuration between a source device and a sink device and a status information exchange. A CEC protocol may provide a high-level control function between various audio visual products of user environments, and may be optionally used. Further, an optional HDMI Ethernet Channel (HEC) may provide an Ethernet compatible data networking between audio return channel (ARC) and the connected devices in an opposite direction from the TMDS.

Video data, audio data and supplementary data may be transmitted and received through three TDMS data channels. Commonly, a TMDS clock runs a video pixel rate, and is transmitted through a TMDS clock channel. The TMDS clock may be used as a reference frequency for data recovery in three TMDS data channels in an HDMI receiver. In a source device, the data of 8 bits per TMDS data channel may be transformed into a sequence of 10 bits of which transition is minimized, which is DC balanced, and transmitted in serial manner with a rate of 10 bits per TMDS clock period.

In order to transmit audio data and supplementary data through the TMDS channel, the HDMI uses a packet structure. In order to attain high reliability for audio data and control data, data may be transmitted in word of 10 bits which is generated by using a BCH error correction code and an error reduction coding.

A source device may identify configuration information and available functions of a sink device by reading Enhanced Extended Display Identification Data (E-EDID) through the Display Data Channel (DDC). The E-EDID may be referred to EDID information below.

A utility line may be used for an optional extension function such as HEAC.

The source device 100 may receive the Extended Display Identification Data (EDID) information from the sink device 200. The source device 100 may detect configuration information, support function, and the like of the sink device 200 by parsing the received EDID information. The EDID information may include at least one block that includes various information on the sink device 200.

The source device 100 may include at least one of a display unit 110, a user input interface unit (or user input interface) 120, a control unit 180, a transmitter Tx (or HDMI Tx), a memory unit 140, a storage unit (or storage) 150, a multimedia unit (or multimedia module) 160, a power control unit (or power management) 130 or a power supply unit (or power supply) 170.

The sink device 200 may include at least one of an EDID EEPROM 210, a power control unit (or power management) 220, a display unit 230, a user input interface unit (or user input interface) 240, a receiver Rx (or HDMI Rx), a control unit 280, a power supply unit (or power supply) 250, a memory unit 260 or a multimedia unit (or multimedia module) 270. Hereinafter, description for units that perform the same operation will not be repeated.

The source device 100 represents a physical device for transmitting contents stored in the storage unit 150 to the sink device 200 or streaming the contents. The source device 100 may send a request message to the sink device 200 or receive a request message received from the sink device 200. The source device 100 may provide a UI for processing a response message that the sink device 200 transmits and delivering to a user, and this UI may be provided as a display in case that the source device 100 includes the display unit 110. In addition, the source device 100 may request a power to be supplied to the sink device 200.

The sink device 200 may receive contents from the source device 100. Or The Sink device 200 may transmit a request message to the source device 100 or may transmit a response message by transmitting a request message to the source device 100 or processing the message received from the source device 100. The sink device 200 may also process a response message received from the source device 100, and provide a User Interface (UI) which is delivered to a user. In case that the sink device 200 includes a display unit, the sink device 200 may provide the UI to a display. Furthermore, the sink device 200 can provide the source device 100 with a power that the source device 100 requests.

The user input interface unit 120 or 240 may receive an action or an input of a user. As an embodiment, the user input interface unit 120 or 240 may correspond to a remote controller, a voice receiving/detecting device, a touch input sensing/receiving device, and so on.

The control unit 180 or 280 may control general operations of each device. Particularly, the control unit 180 or 280 may perform a communication between the units included in the respective devices, and may control the operation of each of the devices.

The memory unit 140 or 260 corresponds to volatile physical devices that may store various sorts of data.

The EDID EEPROM 210 corresponds to an EEPROM that stores EDID information.

All of the memory unit 140 or 260, the storage unit 150 and the EDID EEPROM 210 may play the role of storing data, and all of these may be collectively called a memory unit.

The display unit 110 or 230 may display data or contents received through the HDMI, data and UI stored in the memory unit, and the like by control of the control unit 180 or 280.

The multimedia unit 160 or 270 may play various sorts of multimedia. The multimedia unit 160 or 270 may be implemented separately with the control unit 180 or 280, or implemented as an integral physical component with the control unit 180 or 280.

The power supply unit 170 or 250 may supply power required to operate the source device 100, the sink device 200 and units included in these.

The transmitter Tx is a unit for transmitting and receiving data through the HDMI by being included in the source device 100. The transmitter Tx may perform transmission and reception of data that includes commands, requests, actions, responses between devices as well as audio/video data.

The receiver Rx is a unit for transmitting and receiving data through the HDMI by being included in the source device 100. The receiver Rx may perform transmission and reception of data that includes commands, requests, actions, responses between devices as well as audio/video data.

The power control unit 130 or 220 may manage and control power transmission and reception between devices through the transmitter Tx and the receiver Rx.

The units except the transmitter Tx, the receiver Rx and the control unit 180 or 280 among the units described above may be included in the source device 100 or the sink device 200, selectively according to an embodiment, and may not correspond to essential component units.

Recently, as the UHD TV is started to be used, the UHD contents are provided through various storage media and services in order to provide a sense of vivid realism and a sense of immersion to a viewer. As a way for a viewer to enjoy the UHD contents, the viewer may enjoy uncompressed videos by connecting external source devices such as a UHD TV, a set-top box, a blue-ray disk player, and the like to wired video interfaces such as an HDMI, a DisplayPort, and so on. Furthermore, portable devices such as a smart phone, a tablet, an ultra notebook PC, and the like are started to be provided as the UHD contents source devices. However, there is a restriction in stably providing high-definition (about 8K or more) UHD contents in high speed using only the channels which are defined in the conventional HDMI system of version 2.0 or lower.

Accordingly, in new HDMI version 2.1, a method may be proposed that the TMDS clock channel which is defined previously is used for a channel for transmitting UHD contents data, and the DDC is used for transmitting other data (e.g., clock signals, High-bandwidth Digital Content Protection (HDCP) data, multi-touch data, audio only contents data, and so on) except EDID in addition to the existing function for transmitting the EDID.

Accordingly, according to an HDMI system in the present specification, the DDC may be used for a DDC mode that performs the legacy function (i.e., channel function for transmitting and receiving EDID information) defined in the conventional HDMI system of version 2.0 or lower, and may also be used for a Sideband mode that performs other new functions (e.g., channel function for transmitting and receiving clock signals, High-bandwidth Digital Content Protection (HDCP) data, multi-touch data, audio only contents data, and so on) provided in new HDMI version 2.1 or higher. Hereinafter, for the convenience of description, operations that the HDMI system uses the DDC for the DDC mode or the Sideband mode may be expressed by the expression, 'the DDC is operated in the DDC mode or the Sideband mode'.

Hereinafter, the embodiments in which an HDMI system switches from the DDC mode to the Sideband mode will be described by reference to respective drawings below.

Figure 2:
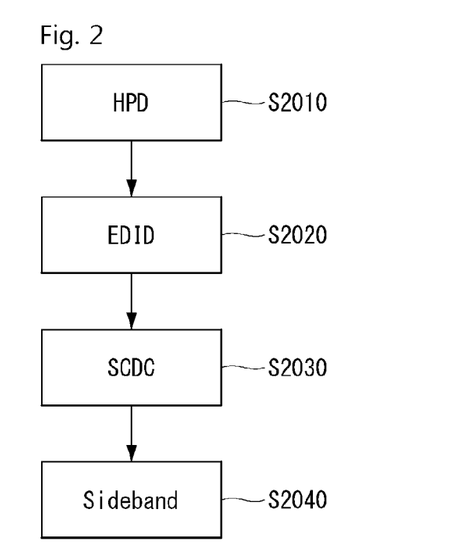
FIG. 2 is a flow chart illustrating an operation of identifying on whether the Sideband mode is supported according to an embodiment of the present invention.

FIG. 2 is a flow chart illustrating an operation of identifying on whether the Sideband mode is supported according to an embodiment of the present invention.

As described above, in the HDMI system of new version, a DDC may be operated in DDC mode or Sideband mode. Accordingly, in the HDMI system of new version, a sink device or a source device is required to preferentially identify whether a counterpart device supports the Sideband mode for operating in the Sideband mode.

Referring to FIG. 2, the source device may transmit +5V signal to the sink device, and receive a Hot Plug Detect (HPD) signal in response to the +5V signal (step, S2010). In more detail, the source device may switch a power line of +5V from low level to high level, and may feed current (hereinafter, may be expressed by transmitting +5V signal). In addition, the sink device, by switching a HPD line from low level to high level (or by transmitting HDP signal), may notify that an HDMI cable is normally connected, and EDID related circuits are activated and an access to EDID information is available.

Next, the sink device may transmit the EDID information including 'Sideband mode support information' that indicates that the sink device supports the Sideband mode to the source device through the DDC (step, S2020). At the moment, the transmitted Sideband mode support information may be transmitted with being included in HDIM Forum-Vendor Specific Data Block (HF-VSDB) included in the EDID information. In other words, the Sideband mode support information is transmitted in the HF-VSDB format. The source device that receives the Sideband mode support information may identify that the sink device is a device that supports the Sideband mode.

Then, the source device may also transmit the 'Sideband mode support information' that indicates that the source device supports the Sideband mode to the sink device (step, S2030). At the moment, the transmitted Sideband mode support information may be transmitted to the sink device in a Status and Control Data Channel (SCDC) format. Accordingly, the Sideband mode support information may be written in a SCDC Structure (SCDCS) stored in a memory of the sink device. By reading the corresponding information which is newly written, the sink device may identify that the source device is a device that supports the Sideband mode.

As such, in case that the source device and the sink device identify that both itself and a counterpart are available to support the Sideband mode, the sink device and the source device may switch modes from the DDC mode to the Sideband mode (step, S2040). More detailed description for the mode switching operation will be described below by reference to FIG. 4 and FIG. 5.

Figure 3:
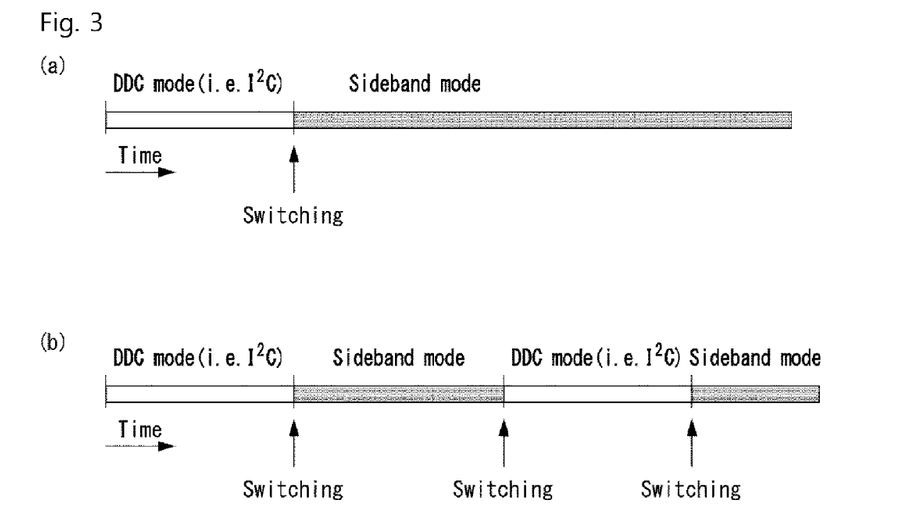
FIG. 3 is a diagram illustrating an embodiment for a mode switching operation according to an embodiment of the present invention.

FIG. 3 is a diagram illustrating an embodiment for a mode switching operation according to an embodiment of the present invention.

Referring to FIG. 3, an HDMI system may be switched from a DDC mode to a Sideband mode or switched from the Sideband mode to the DDC mode. Particularly, in case that the source device and the sink device are connected through an HDMI cable, the source device and the sink device may operate as the DDC mode initially in order to transmit and receive EDID information. Later, according to the procedures described in FIG. 2, in case that the source device and the sink device identify that both itself and a counterpart support the Sideband mode, the source device and the sink device may switch the DDC mode to the Sideband mode.

As an embodiment, as shown in FIG. 3(a), the HDMI system may maintain the Sideband mode (until the HDMI connection is released) after being switched from the DDC mode to the Sideband mode. Otherwise, as another embodiment, as shown in FIG. 3(b), after being switched from the DDC mode to the Sideband mode, the HDMI system may be switched to the DDC mode again. That is, depending on a sort of information/data to transmit and receive, the HDMI system may be switched from the DDC mode to the Sideband mode and switched from the Sideband mode to the DDC mode.

Figure 4:
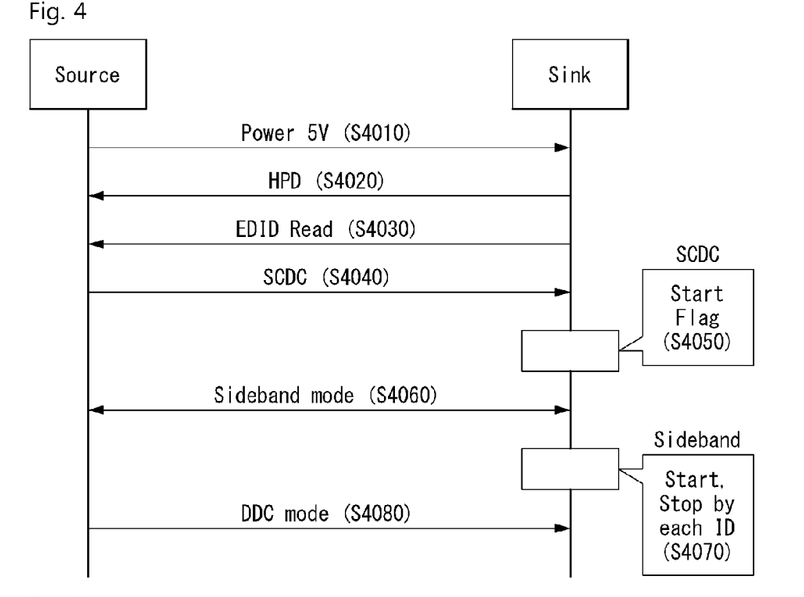
FIG. 4 is a flow chart illustrating a mode switching method for an HDMI system according to an embodiment of the present invention.
Figure 5:
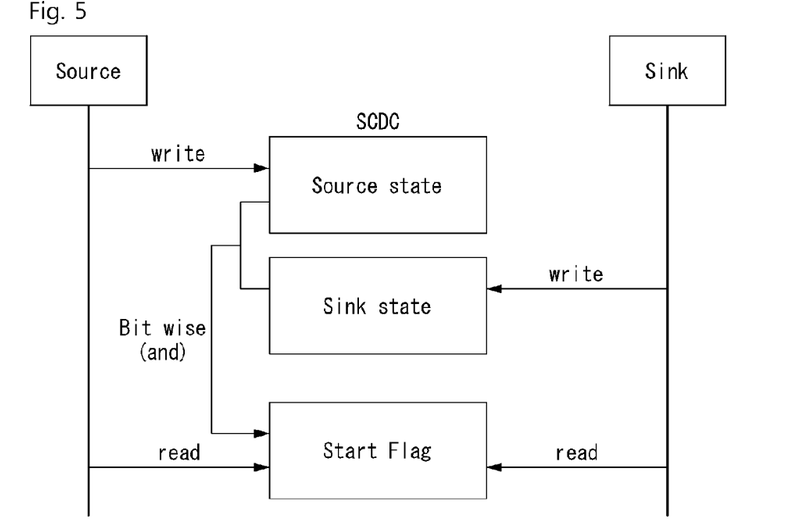
FIG. 5 is a diagram illustrating a logical calculation operation of an HDMI system for mode switching to a Sideband mode.

FIG. 4 is a flow chart illustrating a mode switching method for an HDMI system according to an embodiment of the present invention. FIG. 5 is a diagram illustrating a logical calculation operation of an HDMI system for mode switching to a Sideband mode. In relation to the flow chart of FIG. 4, the description for the flow chart of FIG. 2 may be identically applied. In the flow chart, since step S4010 to step S4040 correspond to step S2010 to step S2030 of FIG. 2, the repeated description will be omitted.

Referring to FIG. 4, in case that the source device and the sink device identify that itself and a counterpart device connected through an HDMI cable support the Sideband mode, the source device and the sink device may perform a mode switching from the DDC mode to the Sideband mode (step, S4060). For this, the sink device may acquire a Start Flag value that indicates a switching to the Sideband mode by performing a logical calculation using the SCDCS (step, S4050).

More particularly, referring to FIG. 5, the source device may transmit Sideband mode support information (or 'second Sideband mode support information') that represents whether to support the Sideband mode to the sink device within the SCDC format, and the corresponding information may be written a Source State field (or bit) (1 bit) within the SCDCS. For example, in case that the sink device receives the Sideband mode support information indicating that the source device supports the Sideband mode, the sink device may write (or fill in) '1' value in the Source State field within the SCDCS. On the contrary, in case that the sink device receives the Sideband mode support information indicating that the source device does not support the Sideband mode, the sink device may write (or fill in) '0' value in the Source State field within the SCDCS.

In addition, in case that the sink device is available to support the Sideband mode, the sink device may write (or fill in) the Sideband mode support information (or 'first Sideband mode support information') representing whether the sink device supports the Sideband mode in the Sink State field (or bit) (1 bit) within the SCDCS. For example, in case that the sink device supports the Sideband mode, the sink device may write (or fill in) '1' value in the Sink State field within the SCDCS. On the contrary, in case that the sink device does not support the Sideband mode, the sink device may write (or fill in) '0' value in the Sink State field within the SCDCS.

Next, the sink device may write (or fill in) the result value of performing logical calculation of the newly written (or updated) Source State field and the Sink State field in the Start Flag within the SCDCS. More particularly, the sink device may write a value of performing 'AND operation' of the newly written (or updated) Source State field value and the Sink State field value in the Start Flag within the SCDCS. In the above example, since both of the Source State field value and the Sink State field value are '1', the sink device may acquire value '1' as a result of AND operation, and write (or fill in) this in the Start Flag.

Such an updated Start Flag may be used as information instructing to perform a mode switching to the Sideband mode. For example, in case that the Start Flag value is '1', it indicates a mode switching to the Sideband mode, and in case that the Start Flag value is '0', it indicates not to switch to the Sideband mode (i.e., maintaining the DDC mode).

Accordingly, by reading the Start Flag within the SCDCS, the source device and the sink device may be instructed whether to perform a mode switching to the Sideband mode. More particularly, the source device may determine whether to perform the mode switching by receiving the information (or a value that the Start Flag instructs) that the Start Flag within the SCDCS instructs from the sink device, and the sink device may determine whether to perform the mode switching by reading the Start Flag value within the SCDCS which is stored in a memory.

As a result of the determination, in case that the Start Flag instructs to perform a mode switching to the Sideband mode, the source device and the sink device may perform a mode switching operation to the Sideband mode. On the contrary, in case that the Start Flag does not instruct to perform a mode switching to the Sideband mode (or in case that the Start Flag does not instruct to switch to the Sideband mode, or in case that the Start Flag instructs to maintain the DDC mode), the source device and the sink device may not perform a mode switching operation to the Sideband mode (or maintain the DDC mode).

Referring to FIG. 4 again, according to the embodiment described in FIG. 5, in case that the source device and the sink device are instructed to perform a mode switching (or returning) to the DDC mode (step, S4070), the source device and the sink device may be returned to the DDC mode (step, S4080). At the moment, as described above in relation to FIG. 5, the source device and the sink device may be instructed whether to perform a mode switching to the DDC mode by reading the Start Flag within the SCDCS. That is, in case that the source device write (or fills in) '0' value in the Source State field or the sink device write (or fills in) '0' value in the Sink State field, the sink device may acquire '0' value as a result of AND operation of the Source State field and the Sink State field, and may write (or fill in) this in the Start Flag.

Such an updated Start Flag may be used as information indicating a mode switching to the DDC mode. The source device and the sink device may perform a mode switching operation to the DDC mode by reading the Start Flag within the SCDCS and identifying whether to perform a mode switching to the DDC mode.

Figure 6:
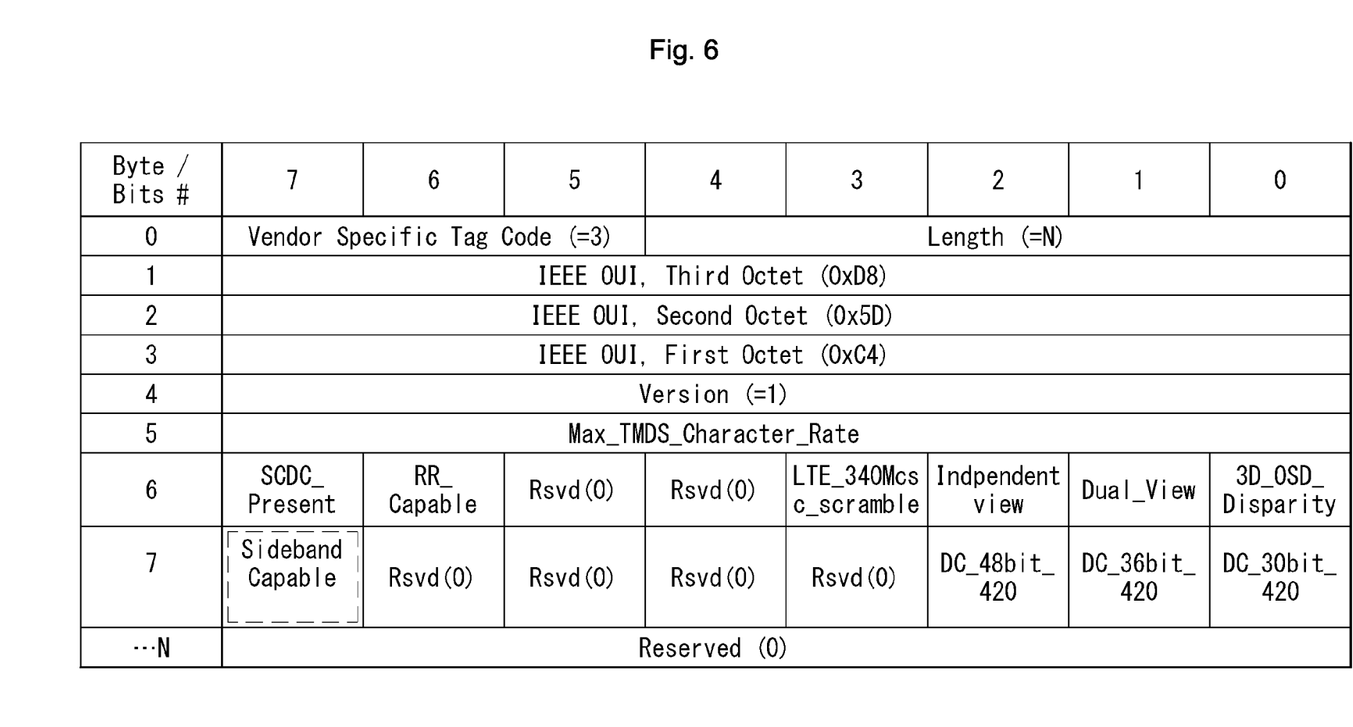
FIG. 6 is a diagram illustrating HF-VSDB included in the EDID information according to an embodiment of the present invention.

FIG. 6 is a diagram illustrating HF-VSDB included in the EDID information according to an embodiment of the present invention.

Referring to FIG. 6, in the HF-VSDB included in the EDID information, the Sideband mode support information that indicates whether to support the Sideband mode may be indicated by Sideband_Capable field. In case that the Sideband_Capable field is '0', it is indicated that the sink device does not support the Sideband mode, and in case that the Sideband_Capable field is '1', it is indicated that the sink device supports the Sideband mode.

Figure 7:
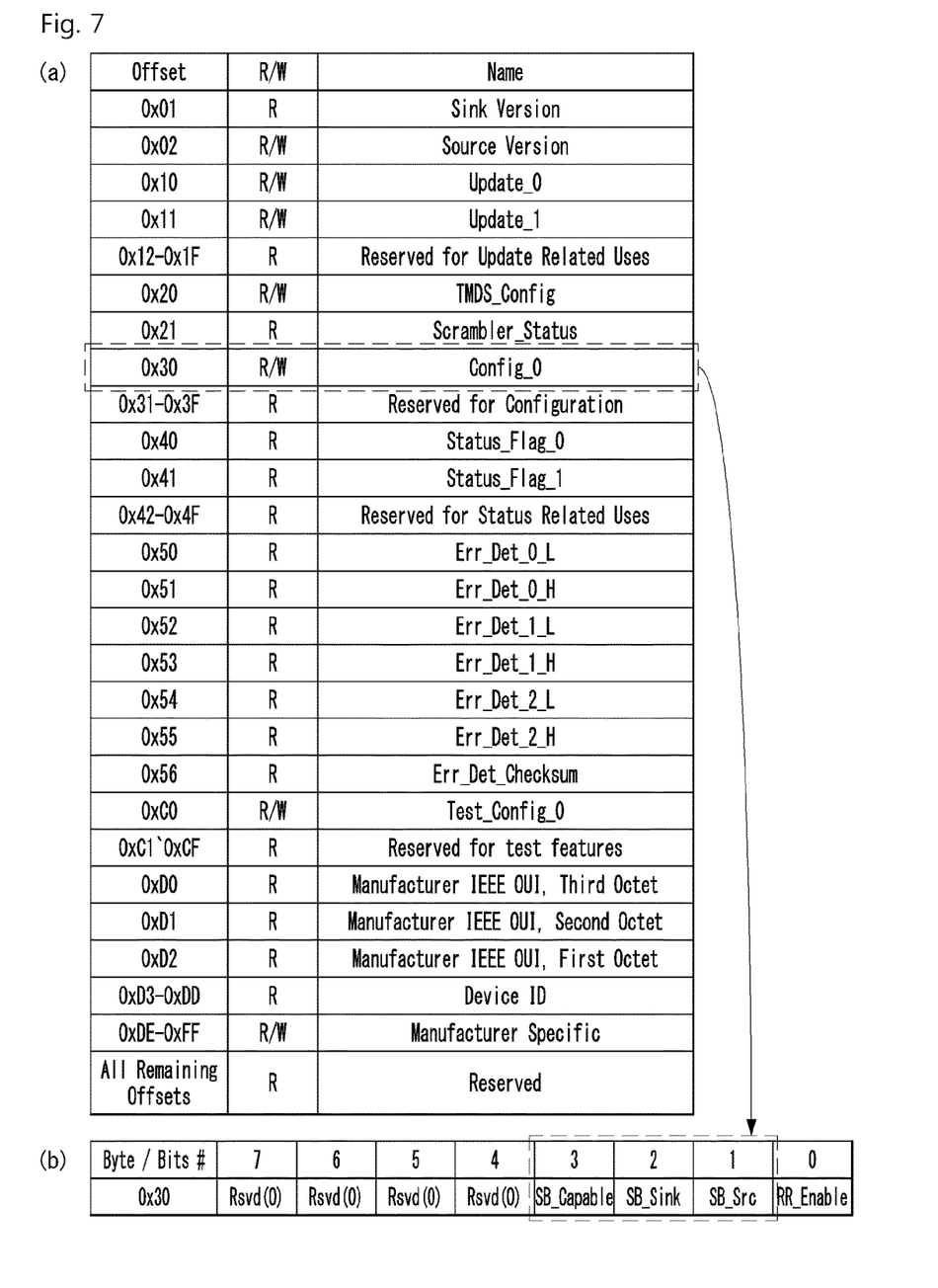
FIG. 7 is a diagram illustrating the SCDSC according to an embodiment of the present invention.

FIG. 7 is a diagram illustrating the SCDSC according to an embodiment of the present invention.

Referring to FIG. 7, the Source State field SB_Scr (1 bit), the Sink State field SB_Sink (1 bit) and the Start Flag SB_Capable (1 bit) may be located in an offset 0x30 within the SCDSC, read and write (R/W) for these may be available. The sink device may acquire/write the Start Flag SB_Capable value by performing AND operation of the Source State field SB_Src and the Sink State field SB_Sink, which is the same as the description of FIG. 5. However, this drawing is just an embodiment of the SDCSC, and may be modified within a range that an ordinary skilled person in the art allows.

Figure 8:
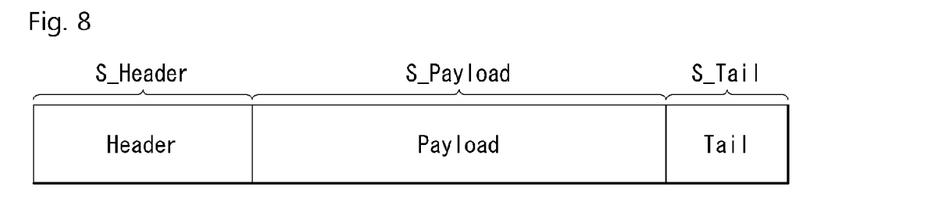
FIG. 8 is a diagram illustrating a Sideband mode packet structure according to an embodiment of the present invention.

FIG. 8 is a diagram illustrating a Sideband mode packet structure according to an embodiment of the present invention. Here, the Sideband mode packet may signify a packet which is transmitted and received through the DDC in the Sideband mode.

Referring to FIG. 8, the Sideband mode packet may include a header, a payload and a tail.

The header S_Header of the Sideband mode packet may include ID information of the source device or the sink device. In addition, S_Header may include Function Type Information on a type of information included in the payload. For example, S_Header may include function type information that indicates a type of information loaded in the payload such as multi-touch information, SCDC format information, control information, mode start/stop information, and so on. Furthermore, in case that a length of the Sideband mode packet is changed depending on the type of information, S_Header may further include length information of the Sideband mode packet. The Sideband mode packet information may be included in S_Header, optionally.

The payload S_Payload of the Sideband mode packet may include commands, information, data, and the like. For example, S_Payload may include various commands, information data, and so on such as multi-touch information, SCDC format information, control information, mode start/stop information, and so on.

The tail S_tail of the Sideband mode packet may include Cyclic Redundancy Checking (CRC), reserved bits, and the like of the Sideband mode packet.

In the Sideband mode, a plurality of slots is transmitted and received through the DDC, and one Sideband mode packet may be transmitted and received through one slot.

In this case, the DDC may be operated in Default mode in which a slot assignor assigns the slots of a predetermined number to one function. For example, in the Default mode, the slot assignor may assign each of twenty four functions (or applications) to one slot (about Mbps). Accordingly, the Sideband mode packet that carries the information on one function in the Default mode may transmitted and received through the DDC using one slot. At the moment, the slot assignor may assign the same number of slots to the sink device and the source device. For example, in case that the slot assignor assigns three slots to the sink device, the slot assignor may assign three slots to the source device in the same way.

Otherwise, the DDC may be operated in a High Speed Mode that the assignor assigns slots variably, not assigns the predetermined number of slots to each function. In this case, different from the Default mode, the slot assignor may assign the more number of slots for the function of transmitting the more data amount in higher speed, and the slot assignor may assign the less number of slots for the function of transmitting the less data amount in lower speed. That is, in high speed mode, the slot assignor may assign various numbers of slots to the corresponding function based on data amount or data speed which is required for a specific function.

Figure 9:
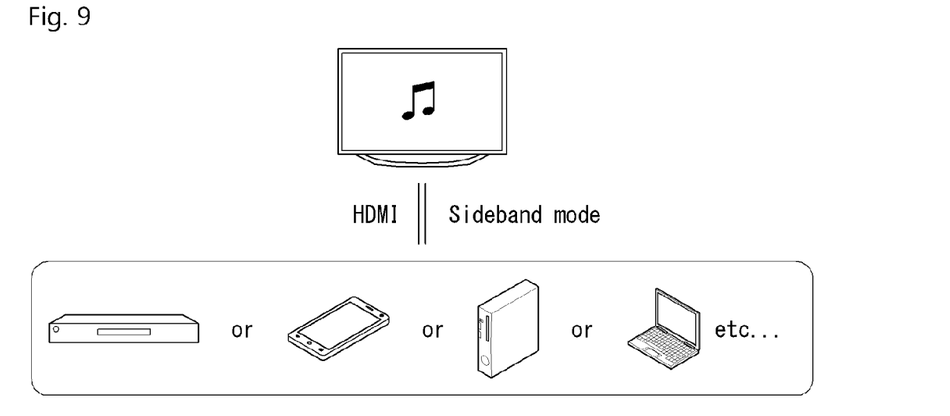
FIG. 9 is a diagram illustrating a first application example of the Sideband mode of the present invention.

FIG. 9 is a diagram illustrating a first application example of the Sideband mode of the present invention.

Referring to FIG. 9, a sink device (e.g., a TV) may be connected to various sorts of source devices (e.g., a DVD device, a mobile phone, a PC, a notebook PC, a tablet PC, etc.). At the moment, the sink device may receive and play Audio Only Contents, that is, contents (or information/data) that include only audio without video information (or data) which is displayed from the source device.

In this case, a video mute command may be transmitted and received between the sink device and the source device. In this case, the video mute command may be transmitted or received through the DDC that operates in the Sideband mode. Here, the video mute command means a command that instructs to power off a display screen by the sink device in order to decrease unnecessary power consumption since it is not required to turn on the display screen in case of playing the Audio Only Contents.

As such, in case of transmitting the video mute command using the DDC of the Sideband mode, effects of increasing reliability exists in transferring and performing the command. In case of Consumer Electronic Control (CEC) protocol, the compatibility between manufacturers is degraded to a certain degree. Accordingly, in case of transmitting and receiving the video mute command as a CEC message, if the manufacturers are different, a problem may occur in performing the video mute command since the compatibility between two devices becomes degraded. However, in case of using the DDC operated in the Sideband mode as the present invention, the compatibility does not matter for each manufacturer, and accordingly, there is an advantage that the video mute command may be performed more stably.

Figure 10:
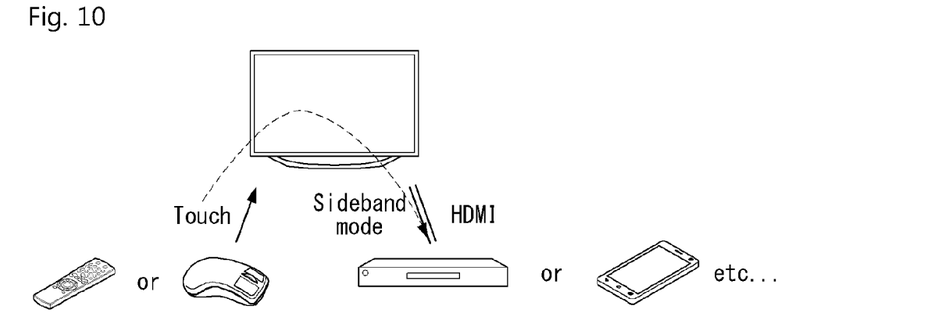
FIG. 10 is a diagram illustrating a second application example of the Sideband mode of the present invention.

FIG. 10 is a diagram illustrating a second application example of the Sideband mode of the present invention.

Referring to FIG. 10, similar to the description of FIG. 9, a sink device (e.g., a TV) may be connected to various sorts of source devices (e.g., a DVD device, a mobile phone, a PC, a notebook PC, a tablet PC, etc.). At the moment, the sink device may receive user input information (or data) which is inputted through an external input means such as a remote controller, a mouse, a stylus pen, a touch pen, and the like, and may deliver the received user input information to the source device.

In this application example, as described above in relation to FIG. 9, the user input information may be transmitted to the source device through the DDC that operates in the Sideband mode, and accordingly, there is an effect that the user input information may be delivered to the source device more stably.

Figure 11:
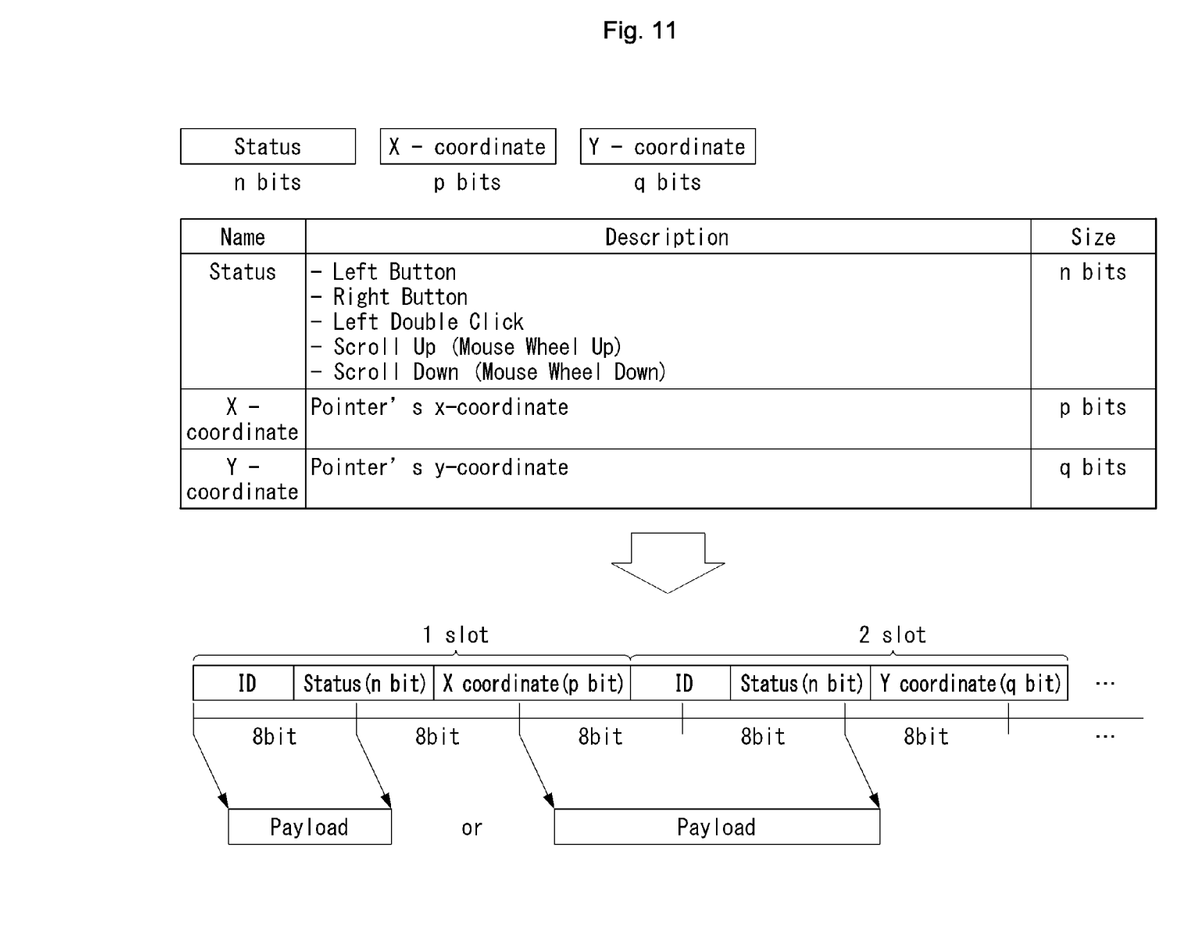
FIG. 11 is a diagram illustrating a Sideband mode packet on which user input information is carried according to an embodiment of the present invention.

FIG. 11 is a diagram illustrating a Sideband mode packet on which user input information is carried according to an embodiment of the present invention.

Referring to FIG. 11, the user input information may include status information, X-axis information and Y-axis information. The status information shows a state of user input. For example, the status information may represent whether a user input is left button input, right button input, left double click, scroll up (or mouse wheel up) or scroll down (or mouse wheel down). The X-axis information and the Y-axis information represent information on a location of the user input. Particularly, the X-axis information may represent horizontal axis location information of the user input, and the Y-axis information may represent vertical axis location information of the user input.

Such user input information may be transmitted from the sink device to the source device with being carried on the Sideband mode packet. At the moment, S_Header of the Sideband mode packet may include ID information of the sink device that transmits the Sideband mode packet, and S_Payload may be transmitted to the source device with the status information (n bit) of the user input, the X-axis information (p bit) and/or the Y-axis information (q bit) being included.

S_Payload may be transmitted in 8 bits size or 16 bits size per one Sideband mode packet.

Figure 12:
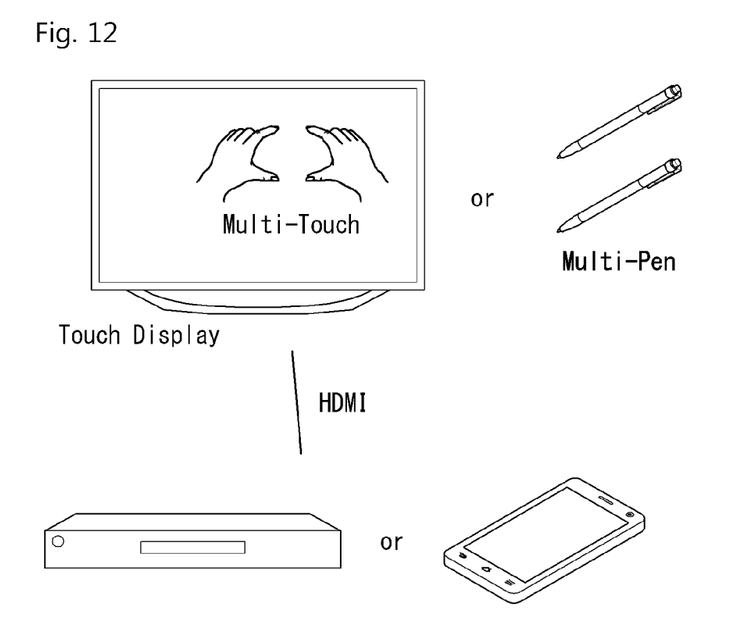
FIG. 12 is a diagram illustrating a third application example of the Sideband mode of the present invention.

FIG. 12 is a diagram illustrating a third application example of the Sideband mode of the present invention.

The third application example of the drawing corresponds to an application example of transmitting and receiving multi-touch input information (or data) inputted by a part of user body or a stylus pen through the Sideband mode packet. Accordingly, in this application example, as described above in relation to FIG. 9, the multi-touch input information may be transmitted to the source device through the DDC that operates in the Sideband mode, and accordingly, there is an effect that the multi-touch input information may be delivered to the source device more stably.

Figure 13:
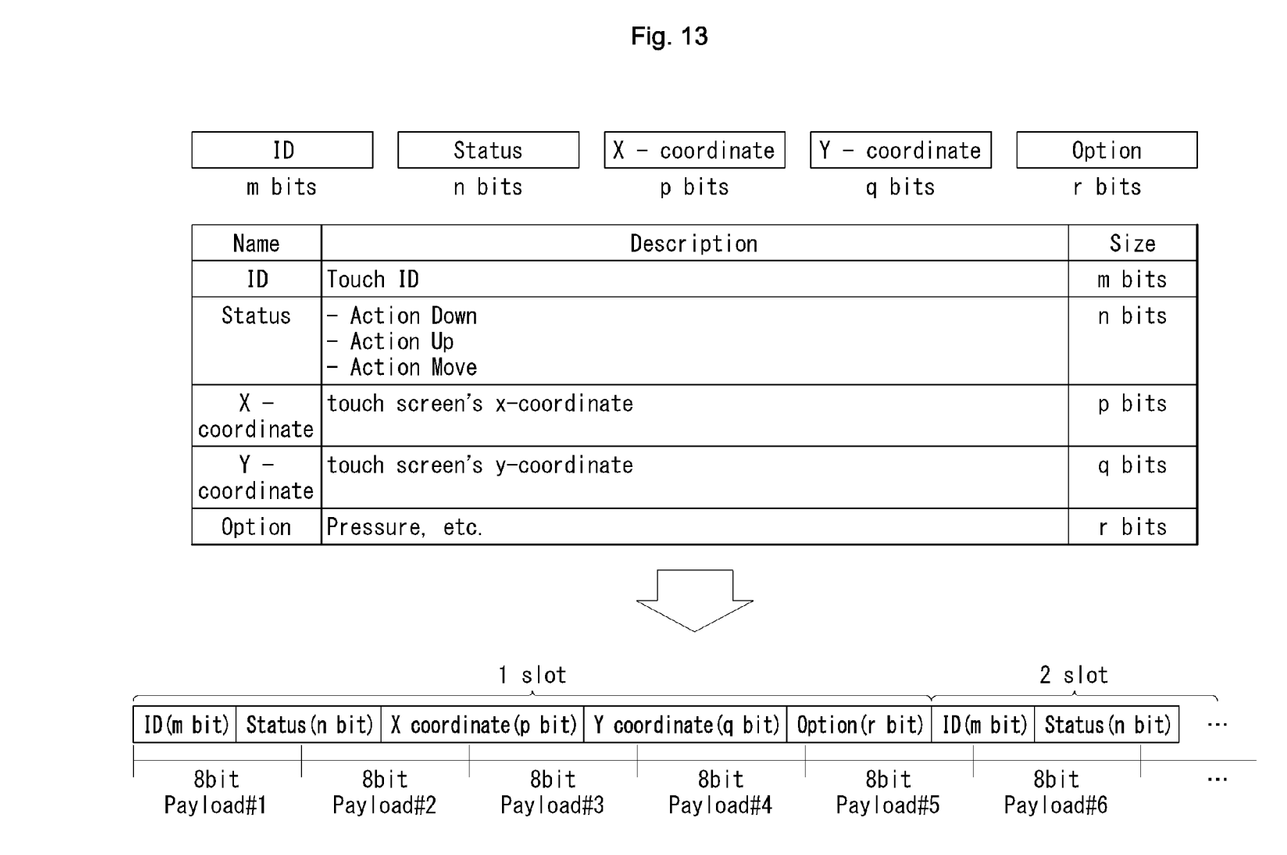
FIG. 13 is a diagram illustrating the Sideband mode packet on which multi-touch input information is carried according to an embodiment of the present invention.

FIG. 13 is a diagram illustrating the Sideband mode packet on which multi-touch input information is carried according to an embodiment of the present invention.

Referring to FIG. 13, the multi-touch input information may include touch ID information, status information, X-axis information, Y-axis information and option information.

The touch ID information shows identification information which is assigned so as to distinguish the input touch information with other touch information. The status information represents information on a moving direction of the multi-touch input. For example, the status information represents whether a moving direction of the multi-touch input is downward, upward, or the like. The X-axis information and the Y-axis information represent information on a location of the multi-touch input. Particularly, the X-axis information may represent horizontal axis location information of the multi-touch input, and the Y-axis information may represent vertical axis location information of the multi-touch input. The option information may represent information on a pressure of the multi-touch input.

Such user input information may be transmitted from the sink device to the source device with being carried on the Sideband mode packet. At the moment, S_Header of the Sideband mode packet may include the touch ID information (m bits), and S_Payload may be transmitted to the source device with the status information (n bit) of the multi-touch input, the X-axis information (p bit), the Y-axis information (q bit) and/or the option information (r bit) being included. S_Payload may be transmitted in 8 bits size or 16 bits size per one Sideband mode packet.

According to an embodiment of the present invention, in order to provide high-definition UHD contents in the best state, the conventional Display Data Channel (DDC) may be used in two modes. As a result, the compatibility with the conventional HDMI system of version 2.0 or lower can be maintained, and at the same time, problems of conventional systems can be solved, which has restrictions in providing the high-definition UHD contents.

The advantageous effects of the present invention will be described in more detail in the above detailed description.

Although the present invention has been described by separate drawings for the convenience of description, it is also possible to design so as to implement a new embodiment by merging the embodiments described for each drawing. In addition, the construction and method of the embodiments described above are not limitedly applied to the display device, but a part or the whole of the embodiments may be selectively combined and constructed so as to implement various modifications.

While the preferred embodiments have been particularly shown and described, the present specification shall not be limited to the particular embodiments described above, and it will be understood by an ordinary skilled person in the art that various changes in form and details may be made therein without departing from the spirit and scope of the present invention as defined by the following claims, and the alternative embodiments should not be individually understood from the inventive concept and prospect of the present invention.

Various embodiments are described as a preferred form to implement the present invention.

The present invention is used in a series of HDMI fields.

It is apparent to an ordinary skilled person in the art that various modifications and changes may be made without departing from the spirit and scope of the present invention. Accordingly, the present invention is intended to include the modifications and changes of the present invention within the attached claims and the equivalent scope.

What is claimed is:

1. A method for switching mode of a source device that uses a High Definition Multimedia Interface (HDMI), comprising:
   connecting to a sink device through the HDMI;
   transmitting +5V signal to the sink device;
   receiving a Hot Plug Detect (HPD) signal from the sink device;
   receiving EDID (Extended Display Identification Data) information including a first Sideband mode support information through a Display Data Channel (DDC) channel that operates in a DDC mode,
   wherein the first Sideband mode support information indicates that the sink device supports a Sideband mode;
   transmitting a second Sideband mode support information to the sink device,
   wherein the second Sideband mode indicates that the source device supports the Sideband mode;
   receiving instruction to switch an operation mode of the DDC channel from the sink device; and
   switching the operation mode of the DDC channel from the DDC mode to the Sideband mode.

2. The method for switching mode of the source device of claim 1,
   wherein the first Sideband mode support information is received in HDIM Forum-Vendor Specific Data Block (HF-VSDB) format, and
   wherein the second Sideband mode support information is transmitted in Status and Control Data Channel (SCDC) format.

3. The method for switching mode of the source device of claim 2, wherein the receiving the instruction to switch an operation mode of the DDC channel includes:
   receiving a result value of a logical calculation of a first field value corresponding the first Sideband mode support information within SCDC structure (SCDCS) of the sink device and a second field value corresponding the second Sideband mode support information received from the source device.

4. The method for switching mode of the source device of claim 3, wherein the sink device is configured to:
   write in '1' in the first field as the first Sideband mode support information within the SCDCS,
   write in '1' in the second field as the second Sideband mode support information received from the source device, and
   obtain the result value by performing AND operation of the first and second field values and transmitting the result value to the source device.

5. The method for switching mode of the source device of claim 1, wherein the Sideband mode is a mode that uses the DDC channel for transmitting and receiving at least one of a clock signal, High-bandwidth Digital Content Protection (HDCP) data, user input information, multi-touch input information or audio only contents.

6. A method for switching mode of a sink device that uses a High Definition Multimedia Interface (HDMI), comprising:
   Connecting to a source device through the HDMI;
   receiving +5V signal from the source device;
   transmitting a Hot Plug Detect (HPD) signal from the source device;
   transmitting EDID (Extended Display Identification Data) information including a first Sideband mode support information through a Display Data Channel (DDC) channel that operates in a DDC mode,
   wherein the first Sideband mode support information indicates that the sink device supports a Sideband mode;
   receiving a second Sideband mode support information from the source device,
   wherein the second Sideband mode indicates that the source device supports the Sideband mode;
   instructing the source device to switch an operation mode of the DDC channel; and
   switching the operation mode of the DDC channel from the DDC mode to the Sideband mode.

7. The method for switching mode of the sink device of claim 6,
   wherein the first Sideband mode support information is transmitted in HDIM Forum-Vendor Specific Data Block (HF-VSDB) format, and
   wherein the second Sideband mode support information is received in Status and Control Data Channel (SCDC) format.

8. The method for switching mode of the sink device of claim 7, wherein the instructing the source device to switch the operation mode of the DDC channel includes:
   transmitting a result value of a logical calculation of a first field value corresponding to the first Sideband mode support information within SCDC structure (SCDCS) of the sink device and a second field value corresponding to the second Sideband mode support information received from the source device.

9. The method for switching mode of the sink device of claim 8, wherein the instructing the source device to switch the operation mode of the DDC channel includes:
   writing '1' in the first field as the first Sideband mode support information within the SCDCS,
   writing '1' in the second field as the second Sideband mode support information received from the source device, and
   obtaining the result value by performing AND operation of the first and second field values.

10. The method for switching mode of the sink device of claim 6, wherein the Sideband mode is a mode that uses the DDC channel for transmitting and receiving at least one of a clock signal, High-bandwidth Digital Content Protection (HDCP) data, user input information, multi-touch input information or audio only contents.

11. A source device performing a mode switching using a High Definition Multimedia Interface (HDMI), comprising:
   a HDMI transmitter configured to transmitting and receiving data through the HDMI; and
   a control unit configured to control the HDMI transmitter,
   wherein the source device is configured to:
   transmit +5V signal to the sink device;
   receive a Hot Plug Detect (HPD) signal from the sink device;
   receive EDID (Extended Display Identification Data) information including a first Sideband mode support information through a Display Data Channel (DDC) channel that operates in a DDC mode,
   wherein the first Sideband mode support information indicates that the sink device supports a Sideband mode;
   transmit a second Sideband mode support information to the sink device,
   wherein the second Sideband mode indicates that the source device supports the Sideband mode;
   receive instruction to switch an operation mode of the DDC channel from the sink device; and
   switch the operation mode of the DDC channel from the DDC mode to the Sideband mode.

12. The method for switching mode of the source device of claim 11,
   wherein the first Sideband mode support information is received in HDIM Forum-Vendor Specific Data Block (HF-VSDB) format, and
   wherein the second Sideband mode support information is transmitted in Status and Control Data Channel (SCDC) format.

13. The method for switching mode of the source device of claim 12, wherein the source device is configured to:
   receive instruction to switch the operation mode of the DDC channel by receiving a result value of a logical calculation of a first field value corresponding to the first Sideband mode support information within SCDC structure (SCDCS) of the sink device and a second field value corresponding to the second Sideband mode support information received from the source device.

14. The method for switching mode of the source device of claim 13, wherein the sink device is configured to:
   write '1' in the first field as the first Sideband mode support information within the SCDCS, write '1' in the second field as the second Sideband mode support information received from the source device, and obtain the result value by performing AND operation of the first and second field values and transmit the result value to the source device.

15. The method for switching mode of the source device of claim 11, wherein the Sideband mode is a mode that uses the DDC channel for transmitting and receiving at least one of a clock signal, High-bandwidth Digital Content Protection (HDCP) data, user input information, multi-touch input information or audio only contents.

16. A sink device performing a mode switching using a High Definition Multimedia Interface (HDMI), comprising:
 a HDMI receiver configured to transmitting and receiving data through the HDMI; and
 a control unit configured to control the HDMI receiver, wherein the sink device is configured to:
 connect to a source device through the HDMI;
 receive +5V signal from the source device;
 transmit a Hot Plug Detect (HPD) signal to the source device;
 transmit EDID (Extended Display Identification Data) information including a first Sideband mode support information through a Display Data Channel (DDC) channel that operates in a DDC mode,
 wherein the first Sideband mode support information indicates that the sink device supports a Sideband mode;
 receive a second Sideband mode support information from the source device,
 wherein the second Sideband mode indicates that the source device supports the Sideband mode;
 instruct the source device to switch an operation mode of the DDC channel; and
 switch the operation mode of the DDC channel from the DDC mode to the Sideband mode.

17. The method for switching mode of the sink device of claim 16,
 wherein the first Sideband mode support information is transmitted in HDIM Forum-Vendor Specific Data Block (HF-VSDB) format, and
 wherein the second Sideband mode support information is received in Status and Control Data Channel (SCDC) format.

18. The method for switching mode of the sink device of claim 17, wherein the sink device is configured to:
 instruct the source device to switch the operation mode of the DDC channel by transmitting a result value of a logical calculation of a first field value corresponding to the first Sideband mode support information within SCDC structure (SCDCS) of the sink device and a second field value corresponding to the second Sideband mode support information received from the source device.

19. The method for switching mode of the sink device of claim 18, wherein the sink device is configured to:
 write '1' in the first field as the first Sideband mode support information within the SCDCS,
 write '1' in the second field as the second Sideband mode support information received from the source device, and
 obtain the result value by performing AND operation of the first and second field values and transmit the result value to the source device.

20. The method for switching mode of the sink device of claim 16, wherein the Sideband mode is a mode that uses the DDC channel for transmitting and receiving at least one of a clock signal, High-bandwidth Digital Content Protection (HDCP) data, user input information, multi-touch input information or audio only contents.

* * * * *